No. 792,339. PATENTED JUNE 13, 1905.
N. MENARD.
BUTTER CUTTING MACHINE.
APPLICATION FILED DEC. 27, 1904.
2 SHEETS—SHEET 1.
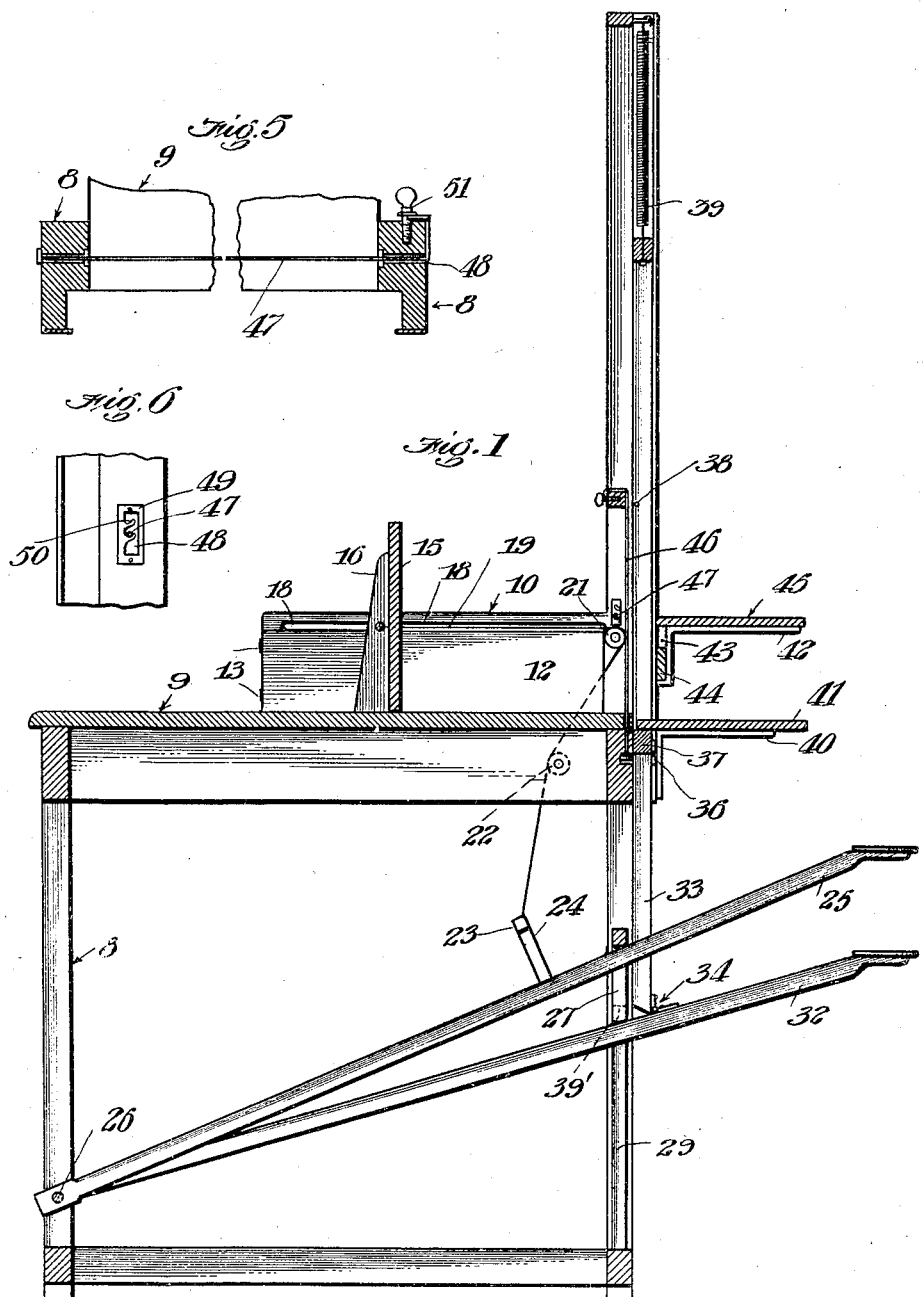
Witnesses
Inventor
Napoleon Menard
by Hazard & Harpham
Attorneys No. 792,339. PATENTED JUNE 13, 1905.
N. MENARD.
BUTTER CUTTING MACHINE.
APPLICATION FILED DEC. 27, 1904.
2 SHEETS—SHEET 2.
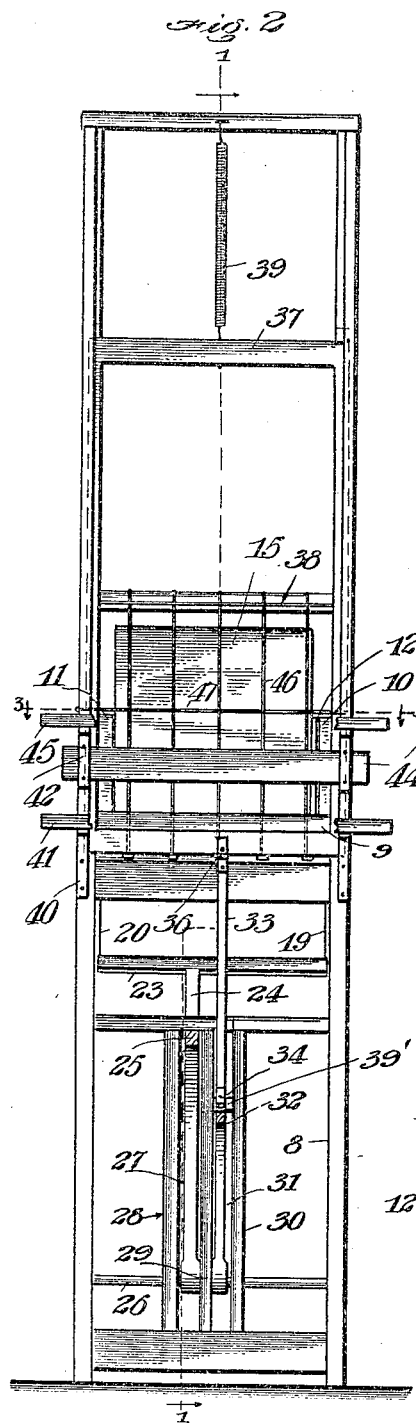
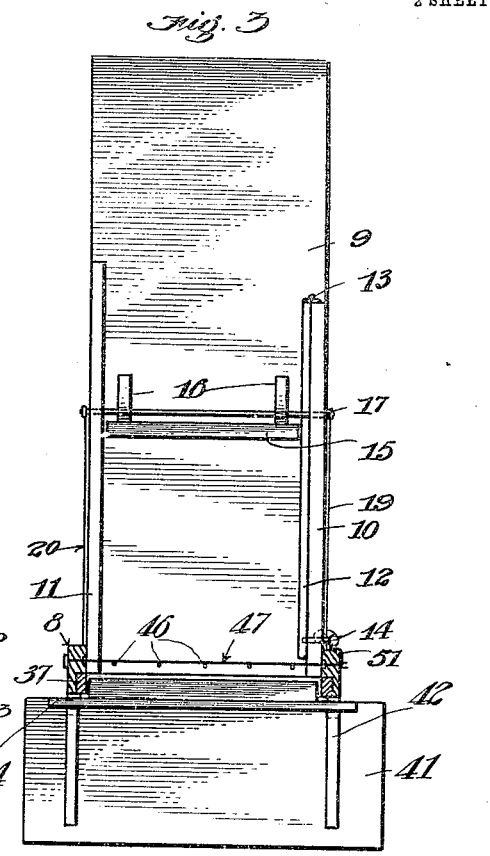
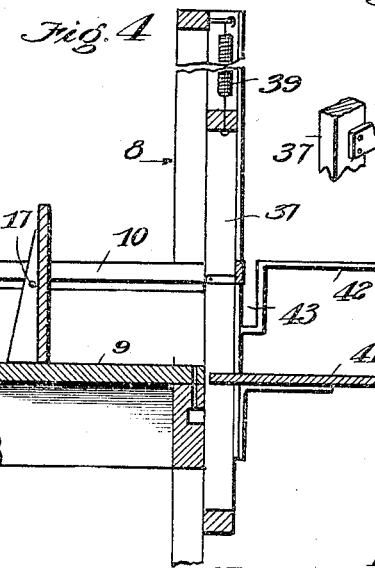
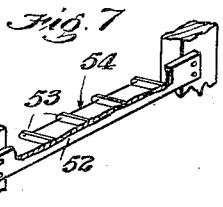
Witnesses
Inventor
Napoleon Menard
by Hazard & Harpham
Attorneys.

No. 792,339.

Patented June 13, 1905.

UNITED STATES PATENT OFFICE.

NAPOLÉON MENARD, OF LOS ANGELES, CALIFORNIA.

BUTTER-CUTTING MACHINE.

SPECIFICATION forming part of Letters Patent No. 792,339, dated June 13, 1905.

Application filed December 27, 1904. Serial No. 238,512.

*To all whom it may concern:*

Be it known that I, NAPOLÉON MENARD, a citizen of the United States, residing at Los Angeles, in the county of Los Angeles and State of California, have invented new and useful Improvements in Butter-Cutting Machines, of which the following is a specification.

In the manufacture of butter at creameries the same is put up into large cubes containing many pounds of butter. In retailing butter it is desirable that these large cubes be cut up into small slabs which shall contain a smaller quantity—say a single pound of butter—as the same is more desirable when in that form; and it is the object of my invention to provide a simple and efficient machine to divide the large bodies of butter into the smaller slabs or pieces. I accomplish this object by the machine described herein and illustrated in the accompanying drawings, in which—

Figure 1 is a vertical longitudinal section of my machine, taken on the line 1 1 of Fig. 2. Fig. 2 is a front elevation with parts broken away and parts in section. Fig. 3 is a sectional plan taken on the line 3 3 of Fig. 2. Fig. 4 is a sectional detail of a portion of the machine, showing it equipped with cutter-knives. Figs. 5 and 6 are details of the shifting mechanism for moving the transverse cutter-wire. Fig. 7 is a detail of the cutter-knives.

In the frame 8 is the horizontal table 9, upon which the butter (not shown) rests while it is being cut into smaller-sized portions with parallel faces. At the forward end of the table are the side boards 10 and 11, which prevent any lateral displacement of the butter as it is being cut into smaller pieces and forms a guideway. As the large cubes are not always of the same size, I provide an adjusting-board 12, which is hinged to the side board 10 by hinges 13, the free end of which may be moved by thumb-screw 14 to keep the large cube of butter in firm contact with the side board 11, said board making the guideway adjustable.

A follower 15 is provided with braces 16, which hold the follower vertically upon the table. Near the center of this follower and passing through the braces is a cross bar or rod 17, the ends of which project through slots in the side boards 10 and 11, one of which slots 18 is shown in side board 10, the other side board being provided with a similar slot. To the ends of the cross-bar 17 are secured flexible wires or cords 19 and 20, which pass over pulleys secured to the frame, one of which pulleys 21 is shown in Fig. 1. These wires then pass over direction-changing pulleys, also affixed to the frame, one of which, 22, is shown in dotted lines in Fig. 1, there being a similar pulley on the other side for wire 20. These wires are then fastened to the ends of cross-bar 23, which cross-bar is secured to an arm 24, fastened to the operating-lever 25, which is hinged to the frame, at the rear end thereof, at 26, the free end projecting to the front of the machine through guideway 27, formed by the vertical bars 28 and 29. A vertical bar 30, acting with vertical bar 29, forms a guideway 31, which guides lever 32, which lever is hinged to the frame at one side of the lever 25 and adjacent thereto. A connecting-bar 33 is connected, by means of hinge 34, to this operating-lever. The upper end of this connecting-bar is connected by hinge 36 to the vertically-moving cutter-frame 37, which frame carries the cutter-wire 38, which makes the vertical cuts through the large cube of butter, as hereinafter explained. To the upper end of this vertical cutter-frame is secured the retraction-spring 39, the other end of which is secured to the stationary part of the frame of the machine.

Affixed to the front of the machine is bracket 40, which supports the shelf 41 for the reception of the small pieces of butter which are cut from the large cube, as hereinafter explained. A bracket 42 is also secured to the front of the machine in such manner as to provide a pocket 43 for the reception of the stop-bar 44, as shown in Fig. 1, and whose use will be explained hereinafter. This last bracket receives a loose shelf 45, which can be removed therefrom when desired. This shelf receives the upper row of pieces of butter when the large cube is cut into a double row of pieces, as hereinafter explained.

In the operation of my machine the large cube of butter (not shown) which it is desired to cut up into small pieces is placed upon the table (the follower being temporarily removed) and pushed between the guideways 10 and 11. The follower is then placed in the rear of the butter and the wires are secured to the cross-bar. The stop-bar 44 is then placed across the front of the machine to limit the movement of the butter. The operator then places his foot upon the free end of lever 25, thereby causing the follower to bring the large cube of butter to the front of the machine until the front end thereof rests against the stop-bar 44. In this forward movement the butter is pushed through the vertical cutting-wires 46, which are placed a sufficient distance apart to give the small piece of butter the desired height. A transverse or horizontal cutting-wire 47 cuts the cube of butter horizontally, to give it the desired length, at the same time it is cut by the vertical wires, the wires 46 and 47 being secured to the stationary part of the frame. The operator then places his foot upon the lever, 32 and brings the cutter-frame downward until the wire 38 has passed through the butter. He then takes his foot off the lever, and spring 39 retracts the frame to its primary position, a stop 39' (shown in dotted lines) preventing any undue upward movement. The transverse horizontal wire 47 passes through slots 48 in the side timbers and through frame 49, which is provided with adjusting-fingers 50, by means of which the height of the horizontal cutting-wire may be adjusted by moving it up or down in the adjusting-frame, the tension being regulated by the screw 51 in the same manner that the tension of piano-wires are regulated. When the butter is very hard, the large cubes of butter are cut to the exact height of a single row of small pieces of butter and the vertical and transverse cutting-wires 46 and 47 are removed from the frame and the vertical cutting-wire 38 is removed from the movable cutting-frame, and in lieu thereof is secured to the movable frame the transverse bar 52, which carries a plurality of steel cutting-knives 53, in the ends of which are secured cutting-wire 54, as best shown in Fig. 7. The butter is then placed on the table and the front end thereof is brought in contact with stop-bar 44, which is then removed. The operator then places his foot upon lever 32 and draws the movable cutter-frame downward, thereby forcing the knives 53 and the cutter-wire 54 to sever from the end of the large slab a row of small pieces, each of which contains the requisite amount of butter, as the length of the knives 53 and the position of the wires 54 in the ends thereof are so regulated that it contains whatever quantity of butter it is desired that the small piece shall contain, such small pieces usually containing one pound of butter.

Having described my invention, what I claim as new, and desire to secure by Letters Patent, is—

1. A butter-cutting machine comprising a table; a guideway thereon having two vertical sides, one of which is adjustable toward the other; a follower in said guideway; means to move said follower toward the front of the table to cut the butter; a plurality of vertical cutting-wires at the front of the table; a vertically-movable frame mounted in the front end of the machine and movable across the guideway; a transverse cutter-wire in said movable frame; and means to move said frame.

2. A butter-cutting machine comprising a table; an adjustable guideway thereon; a follower in said guideway; means to move said follower; a plurality of vertical cutting-wires at the front of the machine; a vertically-movable frame mounted in the front end of the machine and movable across the guideway; a transverse cutter-wire in said movable frame; and means to move said frame.

3. A butter-cutting machine comprising a frame; a table secured to said frame; side boards secured to said table; said side boards having longitudinal slots near the top thereof; a follower on said table between said side boards; braces secured at the back of said follower; a transverse bar passing through said braces and through said slots; pulleys secured at the sides of the frame; cords secured to said cross-bar and passing around said pulleys and having the ends thereof secured to a cross-bar; a lever pivoted in the lower portion of said frame; an arm secured to said lever; a cross-bar secured to said arm, said cross-bar being engaged by said cords; a second lever pivotally mounted in the lower portion of said frame; a vertically-movable cutter-frame mounted at the front portion of said machine; a link-bar pivotally connected thereto and to said last lever; a spring connected to said frame and to the upper end of said stationary frame; a transverse cutter-wire secured in said movable frame; stationary vertical and transverse cutter-wires secured in said frame near the front end of the table; brackets secured to said frame at the front end of said table; and shelves upon said brackets.

4. A butter-cutting machine comprising a frame; a table secured to said frame; side boards secured to said table said side boards having longitudinal slots near the top thereof; an adjusting-board pivotally secured at one of its ends to the rear end of one of said side boards; a thumb-screw passing through the other end of said side board into contact with the movable end of said adjusting-board whereby the position thereof is adjusted; a follower on said table between said side boards; braces secured at the back of said follower; a transverse bar passing through said braces and through the slots in said side boards; a lever pivoted in the lower portion of said frame; an arm secured to said lever; a cross-bar secured to said arm; cords secured to said cross-bar and to the cross-bar of the follower; direction-changing pulleys secured to the frame over which said cords pass; a second lever pivotally mounted in the lower portion of said frame; a vertically-movable cutter-frame mounted at the front portion of said machine; a link-bar pivotally connected thereto and to said last lever; a spring connected to said frame and to the upper end of said stationary frame; and means carried by said movable cutter-frame to cut butter upon said table.

In witness that I claim the foregoing I have hereunto subscribed my name this 19th day of December, 1904.

NAPOLÉON MENARD.

Witnesses:
  MARGARETE C. NICKELESON,
  HENRY T. HAZARD.